United States Patent [19]

Dick

[11] Patent Number: 4,546,213
[45] Date of Patent: Oct. 8, 1985

[54] MODEM SECURITY DEVICE

[76] Inventor: William J. Dick, 281 Fairhaven Blvd., Woodbury, N.Y. 11797

[21] Appl. No.: 603,567

[22] Filed: Apr. 25, 1984

[51] Int. Cl.⁴ ............................................ H04M 11/00
[52] U.S. Cl. ................................. 179/2 A; 179/2 C; 179/2 DP
[58] Field of Search ................. 179/2 A, 2 AM, 2 C, 179/2 CA, 2 DP, 84 C, 84 VF

[56] References Cited

U.S. PATENT DOCUMENTS

| | | | |
|---|---|---|---|
| 3,902,016 | 8/1975 | Blouch | 179/2 A |
| 3,984,637 | 10/1976 | Caudill et al. | 179/2 DP |
| 4,430,728 | 2/1984 | Beitel et al. | 179/2 DP X |

*Primary Examiner*—Gene Z. Rubinson
*Assistant Examiner*—W. J. Brady
*Attorney, Agent, or Firm*—Brumbaugh, Graves, Donohue & Raymond

[57] ABSTRACT

A modem security access circuit device, which is coupled between a dial-up telephone line and an automatic-answering modem, includes a line matching transformer circuit which trips an incoming ringing signal for a predetermined time interval. During the predetermined interval the caller, who receives no indication of the presence of the modem, must send an access code consisting of a preselected sequence of up to ten digits from a DTMF tone pad, or else the line matching transformer circuit disconnects from the telephone line. The device also includes a decoding circuit coupled to the line matching transformer circuit for receiving the access code. If the correct access code is received, the decoding circuit activates a ring supply generator which provides an internal ring signal to activate the modem. The activated modem is then coupled to the telephone line through the line matching transformer circuit and a carrier signal is sent to the caller. In addition, the device includes a lock-out circuit which disables the decoding circuit for a preselected time interval if the caller sends a predetermined number of invalid digits. Furthermore, the device includes a counter circuit for counting the number of invalid digits received and an LED display for visual read-out of the invalid digit count.

11 Claims, 3 Drawing Figures

MODEM SECURITY DEVICE

BACKGROUND OF THE INVENTION

The present invention relates generally to apparatus for safeguarding a computer network against unauthorized entry, and more particularly to circuit apparatus for preventing unauthorized access to a computer coupled to a dial-up telephone line through an automatic-answering modem.

Computer networks vary in complexity from the interconnection of multiple terminals with a host computer to the linking of multiple computers by communications channels. Frequently, the communications channels used for computer networks are ordinary dial-up telephone lines. In a computer network linked by dial-up lines, data are transmitted over analog telephone lines and circuits using analog signaling techniques. Consequently, the computers of such a network are coupled to the dial-up lines through modems (acronym for a modulator/demodulator), which are devices for transforming the digital data signals of the computers to modulated analog signals suitable for transmission over telephone lines and vice versa.

Recently, owing to the increasingly widespread use of computer networks in private business, schools and governmental agencies and the proliferation of terminals and personal computers equipped with communications capability, the problem of protecting computer networks from unauthorized intrusion has been receiving considerable attention. Such unauthorized intrusion may involve the unpermitted use of the computer facilities in the network, the misappropriation of sensitive or proprietary data, the alteration or destruction of valuable data or programs, and, in aggravated cases, the stealing of money, property, services or financial instrument by computer means. The intruder may be an amateur trespasser, commonly referred to as a hacker, who breaks into computers for the challenge and the fun of it or a professional computer criminal motivated by illegal profit.

Computer networks which are linked by dial-up telephone lines are particularly vulnerable to unauthorized entry, owing to the accessibility of the communications channels of such networks by the general public. Normally, unlisted telephone numbers are used for the computer sites in the network. Other conventional techniques for safeguarding dial-up computer networks such as password authentication and data encryption provide protection only after a computer is accessed.

In a typical dial-up network, a telephone line is connected directly to an automatic-answering modem coupled to a computer. When the telephone number of the computer site is dialed by a caller seeking access, a 20 Hz ringing signal appears on the line. This ringing signal causes the modem to "ring trip" (i.e., answer the call) and to send a carrier signal (e.g., a 1070 Hz tone) to the caller. Upon receiving the carrier the caller is required to initiate an exchange of "handshake" signals with the modem within 20 to 30 seconds. Otherwise, the modem disconnects from the line. Normally, the exchange of handshake signals is initiated by the caller activating a local modem.

Once handshake is completed, the caller receives an acknowledgement signal indicating that the computer sought to be accessed is connected to the line. If password authentication is implemented, the computer is programmed to require a valid "password" to be sent by the caller before transactions are permitted. Generally, the computer is also programmed to disconnect from the line if a valid password is not received after a certain number of attempts by the caller in sending such a password. If data encryption is used, the computers of the network are typically provided with encryption/decryption hardware of software such that an unauthorized caller without the proper cryptographic equipment is prevented from using the computers and the data transmitted by the computers.

The problem with the foregoing known techniques for safeguarding a dial-up computer network is that such techniques tend to be ineffective against a determined intruder for the reason that the automatic-answering modem used with a computer of the network brings the computer on line without access control once the telephone number of the computer site is dialed and handshake with the modem is performed. Furthermore, because the modem automatically responds to a line ringing signal by sending a carrier tone, unlisted telephone numbers of computer sites are susceptible to discovery by an intruder using automatic equipment to randomly dial telephone numbers and identifying those numbers that respond with a carrier tone. Once the telephone number of a computer site is known, a caller can obtain virtually unlimited access time to the computer at the site by repeatedly re-dialing that number. Under those conditions, even the most elaborate password scheme is vulnerable to penetration by random or systematic search techniques, particularly since the re-dialing of the computer and the searching for the password can be performed automatically using computerized equipment. Likewise, data encryption methods are also susceptible of being broken by automated deciphering techniques given sufficient access time. Therefore, a need clearly exists for an effective technique for preventing unauthorized access to a computer coupled to a dial-up computer network through an automatic-answering modem.

SUMMARY OF THE INVENTION

The problems of the prior art discussed above are substantially alleviated by the present invention which in one aspect is a circuit device for preventing unauthorized access to data processing equipment coupled to a dial-up computer network through an automatic-answering modem. The device, which is interposed between the telephone line and the modem, includes a line matching transformer with its primary circuit connected to the telephone line and provisions in the primary circuit for tripping a ringing signal on the line by terminating the line with an appropriate impedance for a predetermined time interval. During that time interval, the caller, having received no acknowledgement, is required to send an access code consisting of a preselected sequence of dial signals either from a dual-tone multiple frequency key pad or from a rotary telephone dial. In addition, the device includes a decoder for decoding the dial signals received during the predetermined interval and for activating a ring generator supply when the correct access code is detected. The decoder upon detecting the correct access code also enables switching circuitry which alternately applies a ringing signal from the activated ring generator supply to the modem and connects the modem to the secondary circuit of the matching transformer. The secondary circuit includes provisions for detecting the ring-tripping of the modem and for operating relay circuitry to maintain both the termination of the telephone line and the coupling of the modem to the matching transformer when ring-tripping of the modem is detected.

DETAILED DESCRIPTION

Figure 1:
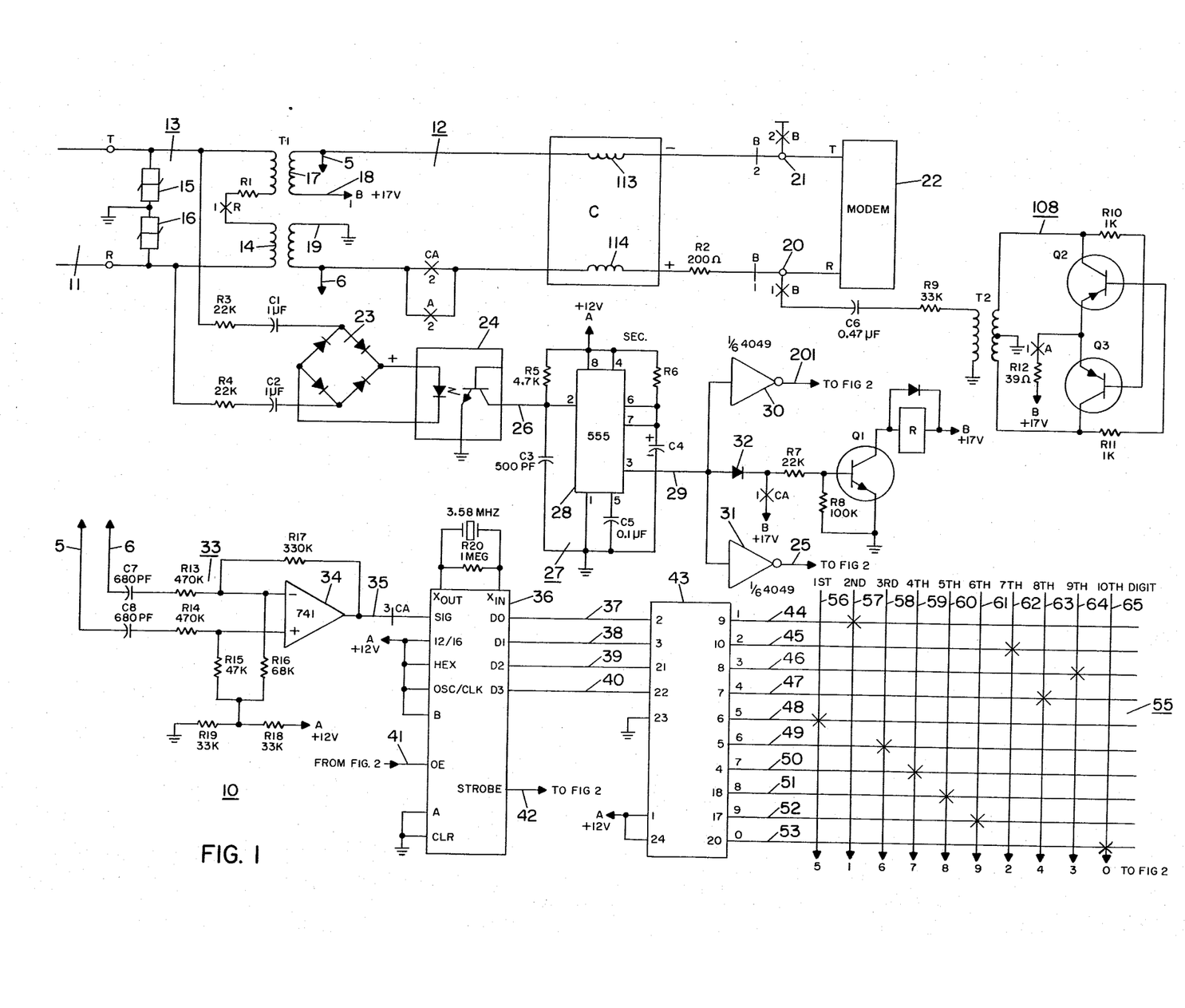
FIGS. 1, 2 and 3 are partial schematic diagrams of a modem security access circuit in accordance with the preferred embodiment of the present invention.

Referring now to FIG. 1, a modem security access circuit 10 according to the preferred embodiment of the present invention is coupled to a dial-up telephone line 11 through a line matching transformer T1, such as a Microtran MT-33 transformer. The transformer T1 has a primary circuit 13 which includes the primary windings 14 of T1, a 600 Ω line termination resistor R1, make-contact 1 of relay R (i.e., a contact which is normally open but closes when relay R is actuated) and surge protection diodes 15 and 16.

The transformer T1 has a secondary circuit 12 which includes the secondary windings 17 of T1, connections 18 and 19 for a +17 V supply and ground, respectively, make-contact 2 of relay CA (see FIG. 2), make-contact 2 of relay A (see FIG. 2), an in-line relay C, such as a Teltone M-949 relay, a resistor R2, break-contacts 1 and 2 (i.e., contacts which are normally closed but open upon actuation of the relay) of a relay B (see FIG. 2) coupling the secondary circuit 12 to terminals 20 and 21, respectively. The terminals 20 and 21 are for connecting the circuit 10 to an automatic-answering modem 22. The modem 22 is coupled to a digital data processing system such as a computer. For simplicity of the drawing, the data processing system is omitted from FIG. 1.

A diode bridge 23 for rectifying an incoming ringing signal on the telephone line 11 is coupled to the primary circuit 13 through capacitors C1 and C2 and resistors R3 and R4. The rectified ringing signal from the diode bridge 23 is applied to an opto-isolator 24, such as a Hewlett-Packard 6N139 opto-isolator, which provides a trigger signal in response to the rectified ringing signal. The trigger signal from the opto-isolator 24 is provided on a conductor 26 to a first timer circuit 27, which includes a timer 28 such as a National Semiconductor Corp. 555 timer, capacitors C3, C4 and C5 and resistors R5 and R6.

Upon receiving the trigger signal, the first timer circuit 27 provides a timing pulse on a conductor 29 to inverters 30 and 31 and to the base of npn transistor Q1 through a diode 32 and a resistor R7. The duration of the timing pulse is determined by the values of resistor R6 and capacitor C4. For R6=1.5MΩ and C3=10 μf the timing pulse duration is approximately 30 seconds. The timing pulse drives transistor Q1 into a conducting state and actuates the relay R causing make-contact 1 of that relay in the primary circuit of T1 to close. The closing of contact 1 of relay R results in the termination of the telephone line 11 with an impedance consisting of the 600 Ω resistor R1 and the primary windings 14 of transformer T1.

At this point in the operation of the circuit 10, the telephone line 11 remains terminated for an interval of time equal to the duration of the timing pulse from the timer circuit 27. During that interval, a caller desiring to communicate with the modem 22 is required to send an access code consisting of a preselected sequence of dial signals. The dial signals are DTMF (Dual-Tone Multiple Frequency) signals generated by the caller depressing appropriate digit keys on a telephone tone pad. In the alternative, the circuit 10 may be modified to receive dial signals in the form of dial pulses generated by the caller dialing appropriate digits on a rotary telephone dial, as will be further described.

The incoming dial signals sent by the caller are inductively coupled to the secondary windings 17 of T1 and applied to an amplifier circuit 33 coupled to the secondary circuit 12 of T1 through conductors 5 and 6. The amplifier circuit 33 consists of an operational amplifier, such as a National Semiconductor Corp. 741 OPAMP, resistors R13, R14, R15, R16, R17, R18 and R19 and capacitors C7 and C8.

The amplified dial signals provided on a conductor 35 are coupled via break-contact 3 of relay CA (see FIG. 2) to a dial signal decoder 36, such as a Teltone M-957 decoder, which provides a 4-bit binary code $D_0$, $D_1$, $D_2$, $D_3$ representing the dial digit being depressed by the calling party. It is noted that the Teltone M-957 decoder 36 may be used for decoding dial signals from a rotary dial as well as DTMF signals, in accordance with its manufacturer's specifications. The dial signal decoder 36 is enabled for decoding when a "1" logic level voltage (approximately +12 volts) is applied to its OE input on conductor 41 and is disabled when a "0" logic level voltage (approximately ground) is applied to conductor 41. In addition to providing a binary code corresponding to a received DTMF signal, the dial signal decoder 36 also provides a STROBE signal on conductor 42 when the binary code is stable on output conductors 37-40.

The binary code from the dial signal decoder 36 is applied to a 1-out-of-16 decoder 43, such as a National Semiconductor Corp. 4514 decoder, having ten output conductors 44-53 corresponding to dial digits 1-9 and 0, respectively. The decoder 43 responds to a binary code from the dial signal decoder 36 by selecting the output conductor corresponding to the dial digit represented by the binary code, and by causing the voltage on the selected output conductor to go from a "0" logic level to a "1" logic level. The voltage on the selected output conductor returns to a "0" logic level when the caller subsequently releases the depressed key on the tone pad.

The output conductors 44-53 of the decoder 43 are connected to a digit matrix 55 for setting the sequence of dial digits constituting the access code. The digit matrix 55 has ten digit lines 56-65 corresponding to the first through the tenth digit position, respectively, of an access code. A selected access code may be set by connecting, by means of plug contacts, the digit line corresponding to each digit position in the access code to the output conductor of the decoder 43 corresponding to the selected digit for that position. For example, in FIG. 1 the digit lines 56-65 are respectively connected to the output conductors 48, 44, 49, 50, 51, 52, 45, 47, 46 and 53, corresponding to dial digits 5167892430. A connection between a digit line and an output conductor is denoted in FIG. 1 by an "X". It should be noted that the access code used may have any length from one to ten digits. Access codes of fewer than ten digits may be set in the digit matrix 55 by connecting only the required number of digit lines.

Figure 2:
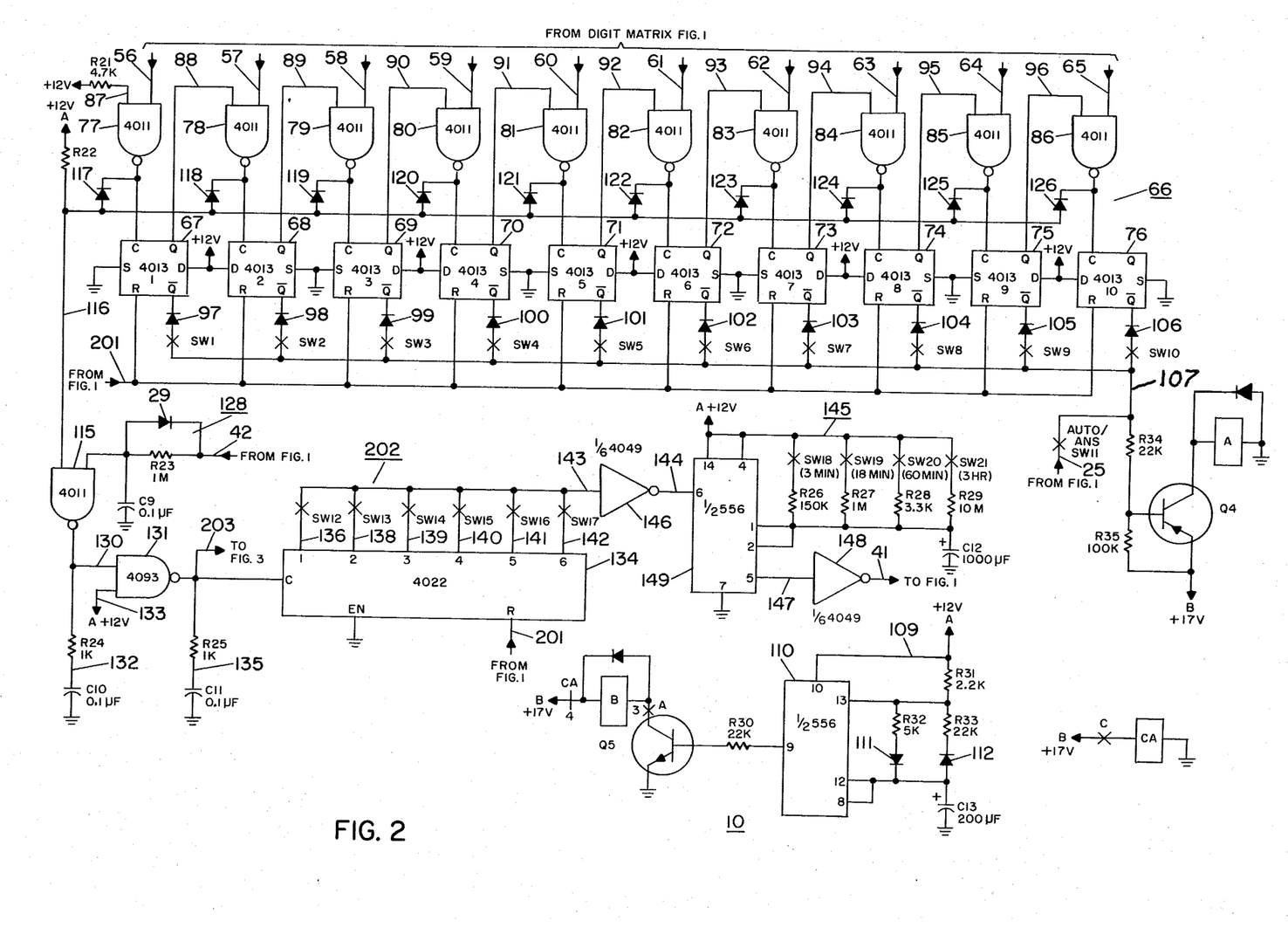

The digit lines 56-65 of the digit matrix 55 are coupled to a sequence comparator circuit 66 shown in FIG. 2. Turning now to FIG. 2, the sequence comparator circuit 66 has ten stages each comprising a type-D flip-flop 67-76, such as a National Semiconductor Corp. 4013 flip-flop, a 2-input NAND gate 77-86, such as a National Semiconductor Corp. 4011 NAND gate, a diode 97-106 and a dipswitch sw1-sw10. Each flip-flop 67-76 has a clock input C connected to the output of the NAND gate 77-86 belonging to the same stage, a data input D connected to a "1" logic level (+12 V) supply connection, a normal output Q, an inverted output $\overline{Q}$, a set input S connected to a "0" logic level (ground) supply connection and a reset input R connected to the output of inverter 30 (see FIG. 1) via a conductor 201.

Each stage of the sequence comparator circuit 66 corresponds to a respective one of the digit positions of the access code and is connected through one input of the NAND gate of the stage to the digit line 56-65 corresponding to the same digit position of the access code. The NAND gate 78-86 of each stage except the first has its other input 88-96 connected to the normal output Q of the flip-flop 67-75 of the preceding stage. The other input 87 of the NAND gate 77 of the first stage is connected through a resistor R21 to a "1" logic level (+12 V) supply connection.

The inverted output $\overline{Q}$ of each of the flip-flops 67-76 is coupled to the output conductor 107 of the sequence comparator circuit 66 through a respective diode 97-106 and a respective dipswitch sw1-sw10. Only the dipswitch of the stage corresponding to the highest digit position of the access code is closed. In the example, the access code 5167892430 is ten digits long. Therefore, sw10 is closed, while sw1-sw9 are all open. If the access code were four digits long, then sw4 would be closed and sw1-sw3 and sw5-sw10 would be open.

The output conductor 107 of the sequence comparator circuit 66 is coupled through a resistor R34 to the base of a pnp transistor Q4. Transistor Q4 is connected in a common-emitter configuration with the winding of relay A in its collector circuit.

Before the first timer circuit 27 (see FIG. 1) is triggered by an in-coming call, the flip-flops 67-76 of the sequence comparator circuit 66 are reset by a "1" logic level voltage from inverter 30 applied to the reset input R of each flip-flop. When a line ringing signal triggers the first timer circuit 27, the timing pulse provided thereby causes the output of inverter 30 to go to a "0" logic level releasing the flip-flops 67-76. Therefore, at the time the line ringing signal is tripped the normal outputs Q of the flip-flops 67-76 are all at a "0" logic level, while the inverted outputs $\overline{Q}$ of those flip-flops are all at a "1" logic level. Under these conditions, the sequence comparator circuit 66 is responsive only to signals on digit line 56, since only NAND gate 77 is enabled.

If at this time a dial signal corresponding to the first digit (5) of the access code is received on the telephone line, the decoders 36 and 43 and the digit matrix 55 cause a "1" logic level voltage to appear on digit line 56 making the output of NAND gate 77 go to a "0" logic level. When the dial signal corresponding to the first digit terminates, the voltage on digit line 56 returns to a "0" logic level, and the output of NAND gate 77 undergoes a "0" to "1" logic level transition clocking the first stage flip-flop 67 and causing its normal output Q to go to a "1" logic level and its inverted output $\overline{Q}$ to go to a "0" logic level. The "1" logic level on the normal output Q of flip-flop 67 enables NAND gate 78 of the second stage making the sequence comparator circuit 66 responsive to signals on digit line 57. The "0" logic level on the inverted output $\overline{Q}$ of flip-flop 67 is not transferred to the output conductor 107 owing to dipswitch sw1 being open.

If the next dial signal received on the telephone line 11 corresponds to the second digit (1) of the access code, the same sequence of events described above takes place to clock flip-flop 68 of the second stage and to enable NAND gate 79 of the third stage. Thus, the decoding process continues until the dial signal corresponding to the tenth digit (0) of the access code is received causing flip-flop 76 of the tenth stage to be clocked and its inverted output $\overline{Q}$ to go to a "0" logic level. Since dipswitch sw10 is closed, the "0" logic level of the inverted output $\overline{Q}$ of the flip-flop 76 is transferred to the output conductor 107 and applied to the base of transistor Q4 through the resistor R34. Under these conditions, transistor Q4 is driven into the conducting state causing relay A to be actuated.

The base of transistor Q4 is also coupled through resistor R34, a dipswitch sw11 and a conductor 25 to the output of inverter 31 (see FIG. 1). The closing of dipswitch sw11 causes the circuit 10 to operate in the auto-answer mode, in which the access code decoding process is by-passed and transistor Q4 is driven into the conducting state by the inverted timing pulse from the first timer circuit 27.

Referring again to FIG. 1, the actuation of relay A causes a ring generator supply 108 consisting of pnp transistors Q2 and Q3, resistors R9, R10, R11 and R12, capacitor C6, and transformer T2 to be activated through the closing of make-contact 1 of relay A. The ring generator supply 108 is coupled to terminals 20 and 21 through make-contacts 1 and 2 of relay B, respectively. The actuation of relay A also causes the voltage supply and ground connections 18 and 19 to be extended to terminals 20 and 21 by the closing of make-contact 2 of relay A.

Returning now to FIG. 2, the actuation of relay A, in addition, enables the operation of relay B whose winding is connected in series with the collector of an npn transistor Q5 by the closing of make-contact 3 of relay A. The other side of the winding of relay B is coupled to a +17 V supply connection by break-contact 4 of relay CA. The base of transistor Q5 is coupled through a resistor R30 to a second timer circuit 109 consisting of a timer 110, such as a National Semiconductor Corp. 556 timer, resistors R31, R32 and R33, diodes 111 and 112, and a capacitor C13. The second timer circuit 109 provides a series of timing pulses which alternately drive transistor Q5 to the conducting state for two seconds and to the non-conducting state for four seconds and cause relay B to be alternately actuated and released for correponding durations.

Turning again to FIG. 1, the actuation and release of relay B bring about the alternate connection of the activated ring generator supply 108 to terminals 20 and 21 while those terminals are disconnected from the secondary circuit 12 of the transformer T1 and the connection of terminals 20 and 21 to the secondary circuit 12 while the ring generator supply circuit is disconnected from those terminals. The application of the activated ring generator supply 108 to terminals 20 and 21 causes the modem to ring-trip by providing an effective 600 Ω resistance across the terminals 20 and 21. Thereafter, the connection of terminals 20 and 21 to the secondary circuit 12 causes a loop current to flow in the secondary circuit actuating relay C.

The actuation of relay C closes the make-contact of relay C to actuate relay CA (see FIG. 2). The actuation of relay CA closes make-contact 1 of relay CA (see FIG. 1) to connect the base of transistor Q1 to a +17 V supply through resistor R7 thereby holding transistor Q1 in the conducting state and the relay R in the actuated state. Under these conditions, make-contact 1 of relay R in the primary circuit of T1 remains closed, and the termination of the telephone line is maintained beyond the duration of the timing pulse from the first timer circuit 27.

In addition, the actuation of relay CA closes make-contact 2 of that relay in the secondary circuit of T1 to maintain the extension of the voltage supply connection and ground to terminals 20 and 21 and opens break-contact 3 of that relay to disconnect the dial signal decoder 36 from the output of the amplifier circuit 33. Furthermore, the actuation of relay CA opens break-contact 4 of that relay to disable relay B (see FIG. 2) and thus maintain the connection of terminals 20 and 21 to the secondary circuit of T1 and the disconnection of the ring generation supply 108 from those terminals.

At this point, communication between the modem 22 and the telephone line 11 is established and a carrier signal is sent to the caller. After the exchange of handshaking signals between the caller and the modem 22, the modem remains connected to the telephone line until the caller hangs up.

It should be noted that up to the time when a carrier signal is sent, the caller receives no indication of the presence of the modem. The incoming call is answered with silence until a valid access code is sent by the caller. Therefore, an unauthorized caller is not alerted to the fact that the telephone number of a computer site has been dialed.

When the caller hangs up, the handshaking signals are removed, and the modem 22 disconnects creating an effective open circuit across terminals 20 and 21. Under these conditions relay C releases, owing to the interruption of the loop current through its windings 113 and 114. The release of relay C brings about the release of relay CA, which in turn effects the release of relay R through the opening of make-contact 1 of relay CA and the return of transistor Q1 to the non-conducting state. The release of relay R causes the opening of make-contact 1 of that relay in the primary circuit 13 of T1 releasing the telephone connection. In addition, the release of relay CA results in the opening of make-contact 2 of that relay to disconnect the voltage supply and ground connections 18 and 19 from the terminals 20 and 21. Furthermore, the release of relay CA brings about the closing of break-contact 3 of relay CA to reconnect the amplifier circuit 33 to the dial signal decoder 36 and the closing of break contact 4 of relay CA to re-enable relay B (see FIG. 2). At this point the modem access security circuit 10 is ready to receive another call.

In the event that the caller sends invalid dial digits while attempting to transmit the access code, the modem security access circuit 10 can "lock-out" the caller from further attempts at sending the access code for a preselected interval of time after receiving a predetermined number of invalid digits by means of a lockout circuit 202 (see FIG. 2). An invalid digit as used hereinafter is defined as a dial digit which does not match the digit of the access code in a particular digit position. For example, in the third digit position of the afore-described exemplary access code 5167892430, any dial digit other than 6 would be an invalid digit.

Referring again to FIG. 2, the lock-out circuit 202 includes a 2-input NAND gate 115, such as a National Semiconductor Corp. 4011 NAND gate, having one input 116 coupled to the outputs of each of the NAND gates 77-86 of the sequence comparator circuit 66 through a respective diode 117-126. Input 116 of NAND gate 115 is also connected to a +12 V supply connection through a pull-up resistor R22. The other input of the NAND gate 115 is coupled through a first pulse shaping network 128 consisting of a resistor R23, a capacitor C9 and a diode 29 to the STROBE output 42 of the dial signal decoder 36.

The output of NAND gate 115 is connected to one input 130 of a Schmitt trigger 131, such as a National Semiconductor Corp. 4093, and to a second pulse shaping network 132 consisting of the series combination of a resistor R24 and a capacitor C10 connected between the output of NAND gate 115 and ground. The other input 133 of the Schmitt trigger 131 is connected to a +12 V supply connection. The output of the Schmitt trigger 131 on conductor 203 is connected to the clock input C of a divide-by-eight synchronous counter 134, such as a National Semiconductor Corp. 4022 counter, and to a third pulse shaping network 135 consisting of the series combination of a resistor R25 and a capacitor C11 connected between the output of the Schmitt trigger 131 and ground.

The counter 134 has six outputs 136, 138-142 each representing a respective count state between one and six. The six outputs 136, 138-142 of the counter 134 are each coupled to an output conductor 143 through a respective dipswitch sw12-sw17. Only one of the dipswitches sw12-sw17 is closed at any given time depending on the number of invalid digits that are to be tolerated before lock-up occurs. For example, if no invalid digits are to be tolerated, then only sw12 is closed. If five invalid digits are to be tolerated, then only sw16 is closed. The counter 134 also includes a reset input R connected through conductor 201 to the ouput of inverter 30 (see FIG. 1) and an "enable" input EN connected to ground.

The output conductor 143 of the counter 134 is coupled to the trigger input 144 of a third timer circuit 145 through an inverter 146. The third timer circuit 145 consists of a timer 149, such as a National Semiconductor Corp. 556 timer, resistors R26, R27, R28 and R29, capacitor C12 and dipswitches sw18-sw21. The third timer circuit 145 provide a "1" logic level timing pulse at its output 147 upon being triggered by a "0" logic level trigger pulse applied to its trigger input 144. The duration of the timing pulses depends upon which one of the dipswitches sw18-sw21 is closed. For the values of R26-R29 and C12 indicated in FIG. 2, the dipswitches sw18, sw19, sw20 and sw21 provide pulse durations of 3, 18, 60 and 180 minutes, respectively. The output 147 of the timer circuit 145 is coupled through an inverter 148 to the OE input of the dial signal decoder 36 (see FIG. 1) via a conductor 41.

As mentioned above, each time the dial signal decoder 36 decodes a received dial signal and provides a binary code corresponding to that dial signal, it also provides a "1" logic level STROBE pulse when the binary code on output conductors 37-40 is stable. If the binary code provided by the dial signal decoder 36 represents a digit of the access code in its proper position in the sequence, the outputs of one of the NAND gates 77-86 of the sequence comparator circuit 66 goes to a "0" logic level disabling NAND gate 115. For that reason, the output of NAND gate 115 remains at a "1" logic level when the STROBE signal from the dial signal decoder 36 is received.

However, if the binary code provided by the dial signal decoder represents an invalid digit, then none of the outputs of the NAND gates 77-86 of the sequence access circuit 66 goes to a "0" logic level, and NAND gate 115 remains enabled. Consequently, when the STROBE pulse is received by NAND gate 115, its output goes to a "0" logic level causing the output of the Schmitt trigger 131 to go to a "1" logic level. Under these conditions, the counter 134, which had been reset by a "1" logic level signal applied to its R input prior to the tripping of the telephone line, is clocked causing its output 136 to go to a "1" logic level. If dipswitch sw1 were closed, the "1" logic level would be transferred to the output conductor 143, and the output of the inverter 144 would go to a "0" logic level triggering the timer circuit 145. If dipswitch sw1 were not closed, the invalid digit count would continue in the counter 134 until the desired count is reached, at which point the third timer circuit 145 would be triggered to provide a timing pulse through the inverter 148 to the OE input of the dial signal decoder 36. The inverted timing pulse applied to the OE input disables the decoder 36 for the duration of the timing pulse, which is determined by the setting of dipswitches sw18-sw21 as described above.

Once the dial signal decoder 36 is disabled, the caller is "locked out", and the modem security circuit 10 eventually disconnects from the telephone line 11 when the first timer circuit 27 times out. The caller remains locked out, even on re-dial, until the third timer circuit 145 times out. During the entire process, the caller is given no indication that invalid digits have been sent, that the modem access security circuit has effected a lock-out, or of the duration of the lock-out.

Figure 3:
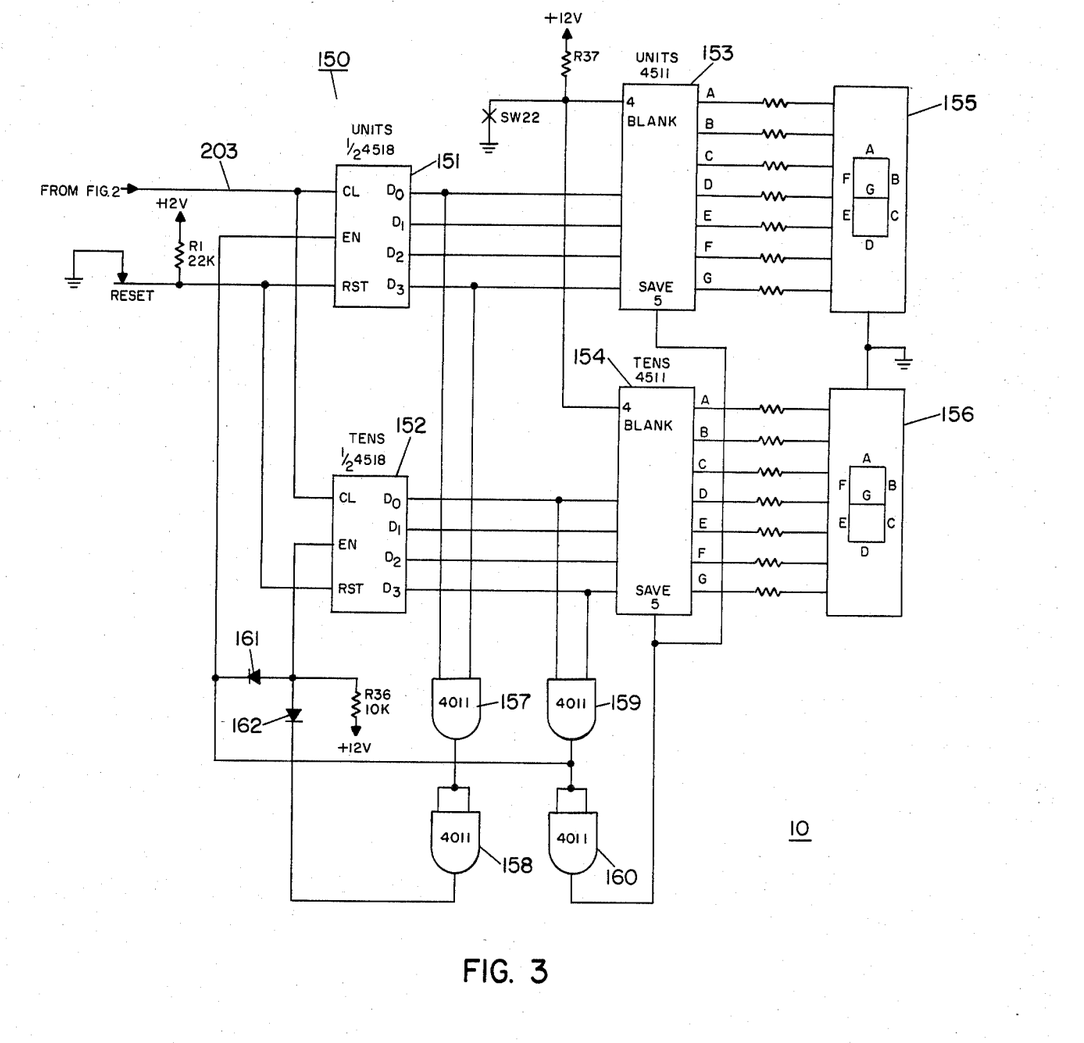

The output of the Schmitt trigger 131 is also provided to an error display circuit 150. Turning now to FIG. 3, the error display circuit 150 includes two divide-by-ten synchronous counters 151 and 152, such as National Semiconductor Corp. 4518 counters, serving as a units counter and a tens counter, respectively. Each counter 151 and 152 has a clock input CL coupled to the output of the Schmitt trigger, an "enable" input EN, a reset input RST connected to a +12 V supply connection through a resistor R1 and also coupled to ground through a RESET switch, and four outputs $D_0$, $D_1$, $D_2$ and $D_3$ for providing a 4-bit binary number representing the state of the count.

Each of the counters 151 and 152 has its outputs connected to a respective light emitting diode (LED) display decoder/driver 153 and 154, such as a National Semiconductor Corp. 4511 decoder/driver. Each of the LED display decoder/drivers is coupled through resistors to a respective seven-segment, common cathode LED display 155 and 156.

In addition, the error display circuit 150 includes four 2-input NAND gates 157-160 and two diodes 161 and 162. The inputs of NAND gate 157 are connected to the $D_0$ and $D_3$ outputs of the units counter 151. The output of NAND gate 157 is connected to both inputs of NAND gate 158. The output of NAND gate 158 is coupled through diode 162 to the EN input of the tens counter 152. The EN input of the tens counter 152 is also coupled to a +12 V supply connection through resistor R36. The inputs of NAND gate 159 are connected to outputs $D_0$ and $D_3$ of tens counter 152. The output of NAND gate 159 is connected to both inputs of NAND gate 160 and to the EN input of units counter 151. The EN input of the units counter 151 is also coupled to a +12 V supply connection through diode 161 and resistor R36. The output of NAND gate 160 is connected to the SAVE inputs both LED display decoder/drivers 153 and 154. Each of the LED display decoder/drivers also has a BLANK input which is coupled to a +12 V supply connection through a resistor R37 and to ground through a switch sw22.

Initially, both the units and tens counters 151 and 152 are reset by manual actuation of the RESET switch, which results in the units counter being enabled by a "1" logic level output from NAND gate 159 and the tens counter being disabled by a "0" logic level output from NAND gate 158. Thereafter, each time an invalid digit is detected the units counter 151 is clocked until a count of nine (1001) is reached, at which time the tens counter is enabled by a "1" logic level output from NAND gate 158. Consequently, the next invalid digit detected causes the count in the units counter 151 to go to a zero and the count in the tens counter 152 to go to a one. The tens counter 152 is again disabled owing to the output of NAND gate 158 returning to a "0" logic level while the units counter remains enabled.

When the total count reaches 99, both counters 151 and 152 are disabled owing to the output of NAND gate 159 being at a "0" logic level. At the same time, the output of NAND gate 160 goes to a "1" logic level causing the count of 99 to be saved in the LED display decoder/drivers 153 and 154. Thereafter, the counters 151 and 152 must be reset in order for further counting to take place.

During the invalid digit counting process, the count in the units and tens counters 151 and 152 are being continuously read-out by the LED displays 155 and 156, respectively. Thus the error display circuit provides computer site personnel with a visual indication of the number of invalid digits being sent by callers. An excessively large number of invalid digits detected serves as warning that an unauthorized caller may have discovered the telephone number of the computer site and may be trying to break the access code. Such warning allows additional steps to be taken to ensure the security of the computer, such as changing the telephone number of the computer site.

It is understood that the specific embodiments described herein are merely illustrative and various alterations and modifications may be made in form and detail by one skilled in the art of electronic design without departing from the spirit and scope of the present invention. For example, the modem security access circuit 10 may be integrated with the modem while retaining its operational relationship with the modem.

I claim:

1. A circuit device for preventing unauthorized communication with an automatic-answering modem comprising:
    connection means for coupling to a telephone line including first means responsive to a line ringing signal on the telephone line for terminating the line with an appropriate impedance for a predetermined time interval;
    terminal means for coupling to the modem;
    decoding means responsive to a preselected sequence of dial signals on the telephone line during the predetermined interval for actuation thereof;
    second means responsive to the actuation of the decoding means for activating the modem and for coupling the terminal means to the connection means, and wherein the connection means includes third means responsive to the activation of the modem for maintaining the coupling between the terminal means and the connection means and for maintaining the termination of the telephone line by the first means thereby to establish communication between the modem and the telephone line.

2. The circuit device according to claim 1 wherein the connection means comprises transformer means having a primary circuit which includes the first means and a secondary circuit which includes the third means and being in communication with the primary circuit, and wherein the second means includes ring generator means responsive to the actuation of the decoding means for providing a ringing signal and fourth means responsive to the actuation of the decoding means for alternately applying the ringing signal from the ring generator means to the terminal means and coupling the terminal means to the secondary circuit of the transformer means.

3. The circuit device according to claim 2 further comprising lock-out means responsive to a selectable number of dial signals corresponding to invalid digits during the predetermined interval for disabling the decoding means for a preselected duration.

4. The circuit device according to claim 3 further comprising counter means for counting the number of dial signals corresponding to invalid digits and for accumulating an error count, and read-out means responsive to the counter means for visually displaying the error count.

5. The circuit device according to claim 3 wherein the decoding means comprises a first decoder coupled to the secondary circuit of the transformer means for receiving the dial signals and responsive thereto for providing digital codes each representing a dial digit corresponding to a received dial signal; a second decoder having a plurality of output lines each one corresponding to a different dial digit, the second decoder being coupled to the first decoder and responsive to each digital code provided thereby for generating a first pulsed signal on the output line corresponding to the dial digit represented by the digital code; a digit matrix having a plurality of ordered sequence lines each corresponding to a respective sequential position including a first position, the digit matrix being for coupling preselected ones of the output lines of the second decoder to respective sequence lines corresponding to consecutive sequential positions including the first position; a sequence comparator circuit having a plurality of ordered flip-flop stages each corresponding to a respective sequential position including a first position, each flip-flop stage having an output and being coupled to the sequence line, each flip-flop stage except the stage corresponding to the first position changing its state when the stage corresponding to an immediately preceding position has changed state and the first pulsed signal is received on the sequence line coupled thereto, the first flip-flop stage changing its state when the first pulsed signal is received on the sequence line connected thereto; and first switch means responsive to the output of a preselected one of the flip-flop stages for actuation thereof, the first switch means including a first contact which closes upon the actuation thereof to cause the ring generator means to provide a ringing signal.

6. The circuit device according to claim 5 wherein the first means of the primary circuit of the transformer means comprises a rectifier circuit coupled to the primary circuit for rectifying the line ringing signal received by the primary circuit; an isolator circuit coupled to the rectifying circuit and responsive to the rectified line ringing signal for providing a trigger signal; a first timer circuit coupled to the isolator circuit and responsive to the trigger signal for providing a first timing pulse signal having a duration equal to the predetermined interval; and second switch means coupled to the first timer circuit and responsive to the first timing pulse signal for connecting the appropriate impedance in the primary circuit to terminate the telephone line for the duration of the first timing pulse signal.

7. The circuit device according to claim 6 wherein each flip-flop stage of the sequence comparator circuit comprises: a D-type flip-flop having data, clock and reset inputs and normal and inverted outputs; a two-input NAND gate having an output coupled to the clock input of the flip-flop and a switch for selectably coupling the inverted output of the flip-flop to the first switch means, one of the inputs of the NAND gate of each stage being coupled to the sequence line corresponding to the same sequential position as the stage; the other input of the NAND gate of each stage except the stage corresponding to the first position being coupled to the normal output of the flip-flop of the stage corresponding to an immediately preceding position, the other input of the NAND gate of the stage corresponding to the first position being coupled to receive a "1" logic level, the data input of the flip-flop of each stage being coupled to receive a "1" logic level, and the reset input of the flip-flop of each stage being coupled to the first timer circuit through an inverter to receive the complement of the first timing pulse signal.

8. The circuit device according to claim 7 wherein the first decoder provides a strobe signal each time a dial signal is received thereby and a digital code corresponding to the received dial signal is provided and includes an enabling input for receiving a signal to enable the first decoder, and the lock-out means comprises:

a first two-input NAND gate having one input diode coupled to the output of each one of the NAND gates of the sequence comparator circuit and the other input coupled to receive the strobe signal from the first decoder;

a Schmitt trigger coupled to receive the output of the first NAND gate for providing a trigger signal each time the output of the first NAND gate goes to a "0" logic level;

a multiple stage binary counter coupled to receive the trigger signals from the Schmitt trigger for counting the number of trigger signals received, the counter having a plurality of outputs each one corresponding to a respective state of the counter and providing a signal when the corresponding state is reached by the counter, and a second timer circuit coupled through an inverter to a selected one of the outputs of the counter and responsive to the signal provided thereby for generating a second pulse signal having a preselected duration, and the enabling input of the first decoder being coupled to the second timer circuit through an inverter to receive the complement of the second pulse signal.

9. The circuit device according to claim 8 wherein the fourth means comprises:

a third timer circuit providing periodic pulse signals having preselected pulse width and period; and third switch means having first and second contacts and being enabled by the second timer circuit for alternately closing one and opening the other of the first and second contacts, the first contact being for coupling the ring signal generator means to the terminal means and the second contact being for coupling the terminal means to the secondary circuit of the transformer means.

10. The circuit device according to claim 9 wherein the secondary circuit of the transformer means includes voltage supply and ground connections and the first switch means includes a second contact for coupling the voltage supply and ground connections to the second contact of the second switch means upon actuation of the first switch means.

11. The circuit device of claim 10 wherein the third means of the secondary circuit includes relay means responsive to current flow in the secondary circuit for actuating fourth switch means having a first contact which closes upon actuation thereof for causing the actuation of the second switch means, the fourth switch means having a second contact which close upon actuation thereof for coupling the voltage supply and ground connections to the second contact of the second switch means, the fourth switch means having a third contact which closes upon actuation thereof for disabling the third switch means and thereby maintain coupling between the terminal means and the secondary circuit, and the third switch means having a fourth contact which opens upon actuation thereof for uncoupling the first decoder from the secondary circuit of the transformer means.

* * * * *